US009711957B2

(12) United States Patent
Trojanowski

(10) Patent No.: US 9,711,957 B2
(45) Date of Patent: Jul. 18, 2017

(54) SCREWLESS AND SEAMLESS COVER PLATE AND COVER PLATE ASSEMBLIES THAT COMPRISE ONE OR MORE RETENTION MEMBERS THAT SELECTIVELY ENGAGE AND SUBSTANTIALLY CONFORM TO THE OUTER SURFACE AND EDGES OF AN ELECTRICAL OUTLET OR SWITCH, OR AUDIO, DATA, OR VIDEO PLUG, CABLE, OR CONNECTOR, TO RELEASABLY SECURE THE COVER PLATE SUB-ASSEMBLY THERETO

(71) Applicant: Joseph Trojanowski, Oak Park, IL (US)

(72) Inventor: Joseph Trojanowski, Oak Park, IL (US)

(*) Notice: Subject to any disclaimer, the term of this patent is extended or adjusted under 35 U.S.C. 154(b) by 0 days.

(21) Appl. No.: 14/992,788

(22) Filed: Jan. 11, 2016

(65) Prior Publication Data

US 2016/0204588 A1    Jul. 14, 2016

Related U.S. Application Data

(63) Continuation-in-part of application No. 14/455,850, filed on Aug. 8, 2014, which is a continuation-in-part of application No. 14/136,646, filed on Dec. 20, 2013, which is a continuation-in-part of application No. 13/745,855, filed on Jan. 20, 2013.

(60) Provisional application No. 61/694,794, filed on Aug. 30, 2012.

(51) Int. Cl.
*H02G 3/14* (2006.01)
*H02G 3/08* (2006.01)

(52) U.S. Cl.
CPC .............. *H02G 3/081* (2013.01); *H02G 3/14* (2013.01)

(58) Field of Classification Search
CPC ................................ H02G 3/081; H02G 3/14
USPC ... 174/66, 67, 68.1, 480, 481, 502, 503, 520
See application file for complete search history.

(56) References Cited

U.S. PATENT DOCUMENTS

| | | |
|---|---|---|
| 4,133,246 A | 1/1979 | Small |
| 4,733,330 A | 3/1988 | Tanaka |
| 4,800,239 A | 1/1989 | Hill |
| 4,846,622 A | 7/1989 | Lien |
| 4,890,418 A | 1/1990 | Sachs |
| 5,041,698 A | 8/1991 | Takagi |

(Continued)

OTHER PUBLICATIONS

Stephen K. Schindler, "Receptacle Cover", Design U.S. Appl. No. 29/319,198, filed Jun. 5, 2008, expressly abandoned Jun. 12, 2009.

(Continued)

*Primary Examiner* — Tremesha S Willis
(74) *Attorney, Agent, or Firm* — Peter B. Scull; Hamilton, DeSanctis & Cha LLP

(57) ABSTRACT

Cover plates are provided for electrical fixtures including a screwless cover plate and/or cover plate assembly for electrical devices that cover the fixtures but provide holes for plugs, light switches, audio, data, or video connectors, and that optionally do not show screw or attachment holes, and where the cover plate is part of a cover plate assembly that comprises one or more retention members selectively engage and substantially conform to the outer surface and edges of the electrical outlet or switch, or audio, data, or video plug, cable, or connector, to releasably secure the cover plate sub-assembly thereto.

18 Claims, 4 Drawing Sheets

(56) References Cited

U.S. PATENT DOCUMENTS

| | | |
|---|---|---|
| 5,158,478 A | 10/1992 | Schuplin |
| 5,178,501 A | 1/1993 | Carstairs |
| 5,180,886 A | 1/1993 | Dierenbach et al. |
| 5,211,580 A | 5/1993 | Schuplin |
| 5,456,373 A | 10/1995 | Ford |
| 5,477,010 A | 12/1995 | Buckshaw |
| 5,632,584 A | 5/1997 | Acevedo |
| 5,736,674 A | 4/1998 | Gretz |
| 5,773,760 A | 6/1998 | Stark |
| 5,965,846 A | 10/1999 | Shotey |
| 6,051,785 A | 4/2000 | Baldwin |
| 6,095,850 A | 8/2000 | Liu |
| 6,278,062 B1 | 8/2001 | Sowdon |
| 6,444,909 B1 | 9/2002 | Prenderville |
| 6,483,032 B2 | 11/2002 | Adams |
| 6,532,626 B2 | 3/2003 | Muller et al. |
| 6,642,453 B2 | 11/2003 | Shotey et al. |
| D484,392 S | 12/2003 | Mayo et al. |
| 6,878,878 B2 | 4/2005 | Westlake |
| 7,007,906 B2 | 3/2006 | Slatter |
| 7,047,655 B2 | 5/2006 | Larsson |
| D525,152 S | 7/2006 | Smith |
| 7,071,414 B2 | 7/2006 | Kim |
| 7,074,078 B2 | 7/2006 | Shotey et al. |
| 7,075,009 B1 | 7/2006 | Rohmer |
| 7,102,081 B2 | 9/2006 | Xu |
| 7,119,278 B1 | 10/2006 | Shotey |
| 7,129,412 B2 | 10/2006 | Pierce |
| D534,058 S | 12/2006 | Fields |
| 7,265,292 B2 | 9/2007 | Greenfield |
| D560,116 S | 1/2008 | Brassard |
| D588,903 S | 3/2009 | Carnevali |
| 7,622,676 B2 | 11/2009 | Drane et al. |
| 7,728,226 B2 | 6/2010 | Drane |
| 7,753,626 B2 | 7/2010 | Musil et al. |
| 7,902,458 B2 | 3/2011 | Eshelman |
| D661,176 S | 6/2012 | Schindler |
| 8,197,518 B2 | 6/2012 | Hammill, Sr. et al. |
| 8,277,490 B2 | 10/2012 | Freeman et al. |
| 8,480,395 B2 | 7/2013 | D Alise |
| 8,558,710 B1 | 10/2013 | Nitz |
| 2002/0100602 A1 | 8/2002 | Shotey et al. |
| 2005/0000719 A1 | 1/2005 | Shotey et al. |
| 2005/0252753 A1 | 11/2005 | Leo |
| 2006/0073731 A1 | 4/2006 | Chien |
| 2008/0236884 A1 | 10/2008 | Arbel |
| 2009/0049791 A1 | 2/2009 | Struthers |
| 2009/0193724 A1 | 8/2009 | Struthers |
| 2010/0267278 A1 | 10/2010 | Gonzalez |
| 2011/0061885 A1 | 3/2011 | Wilson |
| 2013/0042539 A1 | 2/2013 | Burns |
| 2014/0060878 A1 | 3/2014 | Trojanowski |
| 2014/0182876 A1 | 7/2014 | Trojanowski |
| 2014/0367136 A1 | 12/2014 | Trojanowski |
| 2016/0040700 A1 | 2/2016 | Trojanowski |

OTHER PUBLICATIONS

Betsy E. Fields, "Wall Plate", Design U.S. Appl. No. 29/244,676, filed Dec. 13, 2005, now patent No. D534058.

SCREWLESS AND SEAMLESS COVER PLATE AND COVER PLATE ASSEMBLIES THAT COMPRISE ONE OR MORE RETENTION MEMBERS THAT SELECTIVELY ENGAGE AND SUBSTANTIALLY CONFORM TO THE OUTER SURFACE AND EDGES OF AN ELECTRICAL OUTLET OR SWITCH, OR AUDIO, DATA, OR VIDEO PLUG, CABLE, OR CONNECTOR, TO RELEASABLY SECURE THE COVER PLATE SUB-ASSEMBLY THERETO

PRIORITY

This application claims priority to: provisional application U.S. Appl. No. 61/694,794, filed Aug. 30, 2012, filed 2012 Aug. 30, and co-pending non provisional U.S. application Ser. No. 13/745,855, filed 2013 Jan. 20, Ser. No. 14/136,646, filed 2013 Dec. 20, and Ser. No. 14/455,850, filed 2014 Aug. 18; all of which applications are entirely incorporated herein by reference. This Application is a continuation in part of each of U.S. application Ser. No. 13/745,281, filed 2013 Jan. 20; Ser. No. 14/136,646, filed 2013 Dec. 20; and Ser. No. 14/455,850, filed 2014 Aug. 18.

FIELD OF THE INVENTION

The technology described herein relates generally to electrical wiring components, electrical devices, receptacle boxes, cover plates, and cover plate assemblies.

BACKGROUND OF THE INVENTION

Known receptacle box cover plates, or faceplates, are typically constructed in the form of a generally flat plate having one or more openings to provide access to a wired device, or the like, mounted in the receptacle box. The purpose of a cover plate is to provide a decorative cover for the receptacle box installation while also preventing operator exposure to the interior of the receptacle box, which in many instances contains electrical wiring. By way of example, a cover plate can cover a receptacle box containing devices such as ON/OFF switches, outlet receptacles, dimmers, motor speed selector switches, coaxial cable connectors, TV antenna connectors, telephone jacks, computer network cable connectors, informational devices such as clocks, thermometers, security systems, and so forth.

As the number of electrical appliances in the average household grows, the need for convenient access to numerous electrical outlets also grows. Electrical outlet assemblies typically comprise a cover plate, and an electrical outlet having multiple female sockets, or electrical receptacles, where the cover plate is screwed onto the outlet or switch and the screws are visible on the outside surface of the cover plate, and where the cover plate usually has openings that provide for the outlets to extend through the cover plate and are not covered by the cover plate.

Additionally, the use of designer or architectural electrical outlet assemblies and/or cover plates are increasing and alternative types are needed to address this demand, as well as the need to provide cover plates that hide the underlying outlets, receptacle box, gaps, and/or screw or attachment holes or connections.

Accordingly, there is a need to address one or more of such problems or needs.

SUMMARY OF THE INVENTION

Cover plates are provided for electrical fixtures including a screwless cover plate and cover plate assembly for electrical devices that covers the outlets but provide holes for plugs, light switches, audio, data, or video connectors, and the like, and that do not show screw or attachment holes and where the cover plate is part of a cover plate assembly that have screwless attachment that attaches to the outlet, switch, wall, or housing or receptacle box, without showing screw holes, e.g., via tabs or other attachment mechanisms, with or without a backing plate, and where the cover plate is part of a cover plate assembly that comprises one or more retention members that selectively engage and substantially conform to the outer surface and edges of the electrical outlet or switch, or audio, data, or video plug, cable, or connector, to releasably secure the cover plate sub-assembly thereto, without the need for additional screws or connectors to attach the cover plate to the outlet, light switch, or audio, data, or video connector.

Optionally provided is a cover plate assembly for at least one electrical outlet or switch, or audio, data, or video plug, cable, or connector, contained in a receptacle box, the cover plate assembly comprising:
  (a) a cover plate sub-assembly that is attachable to at least one electrical outlet or switch, or audio, data, or video plug, cable, or connector, via at least one mounting connector; the cover plate sub-assembly comprising:
    (i) a cover plate comprising outer edge portions circumscribing a generally planar body portion that lies between the outer edge portions in a first plane and that has a generally planar back surface disposed parallel to the first plane; and
    (ii) one or more retention members disposed adjacent to and fixed to the back surface of the cover plate, that lie in a second plane substantially perpendicular to the first plane,
  wherein:
  (A) the one or more retention members selectively engage and substantially conform to the outer surface and edges of the electrical outlet or switch, or audio, data, or video plug, cable, or connector, to releasably secure the cover plate sub-assembly thereto;
  (B) the body portion of the cover plate, when releasably secured to the electrical outlet or switch, or audio, data, or video plug, cable, or connector, covers the electrical outlet or switch, or audio, data, or video plug, cable, or connector, except for openings in the cover plate that are aligned and sized to allow access to the electrical outlet or switch, or audio, data, or video plug, cable, or connector; or insertion of an external electrical, audio, video, or data plug, cable, or connector into the electrical outlet or switch, or audio, data, or video plug, cable, or connector.

The plate assembly can optionally further provide wherein one or more of the retention members of the cover plate assembly include at least one portion that at least partially extends into and conforms to one or more openings or ridges defined by the outer surface or edge of the electrical outlet or switch, or audio, data, or video plug, cable, or connector, for selectively attaching and/or engaging the back surface of the cover plate, such that the electrical outlet or switch, or audio, data, or video plug, cable, or connector openings and the one or more openings in the cover plate are aligned and sized to allow access to the electrical outlet or switch, or audio, data, or video plug, cable, or connector; or insertion of an external electrical, audio, video, or data plug, cable, or connector into the electrical outlet or switch, or audio, data, or video plug, cable, or connector, through the one or more openings in the cover plate.

The plate assembly can optionally further provide wherein one or more of the retention members of the cover plate include one or more engagement surfaces that interface with one or more surfaces or openings or edges of the electrical outlet or switch, or audio, data, or video plug, cable, or connector.

The plate assembly can optionally further provide wherein one or more of the engagement surfaces of the retention members are at an angle relative to the inner plane of the body surface of the cover plate.

The plate assembly can optionally further provide wherein one or more of the retention members of the cover plate include an arm portion having a first thickness, and an end portion having a second thickness greater than the first thickness; or wherein the cover plate sub-assembly further comprises one or more second retention members that conform to the outer surface and/or edges of the electrical outlet or switch, or audio, data, or video plug, cable, or connector, and that lie in both parallel and perpendicular planes to that of the cover plate back surface.

The plate assembly can optionally further comprise openings in the cover plate to accommodate one or more selected from the group consisting of a light switch, a light dimmer, a light or electricity control panel or touchscreen, or sound, wifi, or infrared sensors, receivers or transmitters.

The plate assembly can optionally further provide wherein (a) one or more of the electrical outlets or switches, or audio, data, or video connectors are at least one selected from round, rectangular, or square shaped on the surface perpendicular to the outer surface of the cover plate; (b) are separated from each other at the outward facing surfaces or ends, or (c) are combined as a single unit with two or more the electrical outlet or switch, or audio, data, or video plug, cable, or connector with a single rounded, square, or rectangular shaped surface that is perpendicular to the outward surface of the outlet.

The plate assembly can optionally further comprise mounting holes or connectors of mounting or strapping plates that are provided at one or more of the end, side or middle portions of the mounting or strapping plate; and wherein the mounting holes or connectors align with the mounting holes or connectors of the back surface of one or more electrical outlets or switches, or audio, data, or video connectors, or housing or receptacle box.

The plate assembly can optionally further provide wherein the mounting or strapping plate is connected to the electrical outlet or switch, or audio, data, or video plug, cable, or connector, receptacle box, or wall using a screw or connector that also connects the electrical outlet or switch, or audio, data, or video plug, cable, or connector to the receptacle box or wall.

The plate assembly can optionally further provide wherein the planes of the surfaces of the mounting or strapping plate and/or the cover plate are parallel in the range of 0-10 degrees.

The plate assembly can optionally further provide wherein the footprint of the cover plate is larger than that of the strapping plate or receptacle box to cover any gap between the edge of the receptacle box and the adjacent opening in the wall.

The plate assembly can optionally further provide wherein the edge of the cover plate extends between the cover plate and the wall to cover any gap between the cover plate edge and the wall, or for decorative utility.

The plate assembly can optionally further provide wherein a shape of the edge of the cover plate is selected from the group consisting of rounded, curved, angled, concave, convex, raised, stepped, square, beveled, routed, etched, lined, engraved, and any combination thereof.

The plate assembly can optionally further provide wherein the surface of the cover plate is dyed, colored, painted, printed, clear, transparent, clear and back painted, coated or printed, wall papered, rounded, curved, angled, concave, convex, raised, stepped, square, beveled, routed, etched, lined, engraved, and any combination thereof.

The plate assembly can optionally further provide wherein the cover plate further comprises a spring mechanism and hinge to open the cover from the mounting or strapping plate or receptacle box.

The plate assembly can optionally further provide wherein the spring and hinge are provided in a second cover plate provided over the cover plate and attached to one selected from the cover plate, mounting or strapping plate, the housing or receptacle box, and the wall.

The plate assembly can optionally further comprise a mud ring or raised device plate provided between the cover plate and the mounting or strapping plate, wherein said mud plate is of thickness that makes the back of the cover plate flush with the exposed surface of the wall adjacent to the plate assembly when installed.

The plate assembly can optionally further provide wherein the combined thickness of the cover plate and mounting or strapping plate is less than one selected from the group consisting of ¾, ⅝, 9/16, ½, 7/16, ⅜, 5/16, ¼, ⅛, and 1/16 inches.

Other embodiments of the present disclosure provide electrical outlet or switch, or audio, data, or video plug, cable, or connector, cover plate assemblies that can optionally include an electrical outlet or switch, or audio, data, or video plug, cable, or connector, having at least one electrical receptacle, and a rectangular ring shaped mounting or strapping plate assembly that is attached to the electrical outlet, housing or receptacle box, or wall, e.g., but not limited to by use of the housing or receptacle box or cover plate screw holes provided in the outlet assembly. In some embodiments, the cover plate assembly includes a rectangular ring shaped mounting, backing, or strapping plate that is attachable to the electrical outlet, wall, wall covering, or housing or receptacle box, and a cover plate sub-assembly that is selectively attachable to the rectangular ring shaped mounting or strapping plate without the use of screws. In some embodiments, the cover plate sub-assembly includes a body portion that lies in a first plane, and a first retention member that is fixed to the body portion, and that lies in a second plane parallel to the first plane. The first retention member selectively engages the rectangular ring shaped mounting or strapping plate to releasably secure the cover plate sub-assembly thereto.

The retention member can include or be selected from at least one of, or one or more of, a snap fitting, an elastic strap or cord, a magnet, a hook and loop fastener (e.g., Velcro™), tape, adhesive, glue, a pressure fitting, a spring fitting, a stretchable tension spring, or any hole, edge, ridge, groove in or bead around the top edge, side edge, bottom edge, or side or bottom, of the receptacle, e.g., but not limited to a corresponding bead, groove, ridge, lip, indentation, and the like, on a hidden or covered side, edge or surface of (e.g., back) of the cover plate to releasably connect, associate, hold, attach, correspond, fasten, stick to at least one of, and/or one or more of, at least a portion, edge, surface, protrusion, hole, indentation, groove, lip, and the like, of one or more, or at least one, of the receptacle, mounting plate, outlet, switch, box, housing, audio, data, or video connector, mud plate, and the like.

The audio, data or video connector can be for any known physical or electronic connection, e.g., but not limited to any audio, data or video connector for cable (ethernet, cable, USB (2.0, 3.0, and the like), or fiber optic cable, RG-6, telephone, video or audio cable or wire, and the like), or for wifi, infrared, or radio frequency, or other transmitting and/or receiving of audio, data, or video information in any known form, as known in the art.

In still other embodiments, the present disclosure provides a screw or connection hiding cover plate assembly for an electrical outlet or switch, or audio, data, or video plug, cable, or connector, the cover plate assembly including a rectangular ring shaped mounting or strapping plate that is attachable to the electrical outlet or switch, or audio, data, or video plug, cable, or connector, via the housing or receptacle box attachment or cover plate screw holes, optionally without the use of screws, and that optionally includes a recess defined therein, and a cover plate sub-assembly that is selectively attachable to the rectangular ring shaped mounting or strapping plate. In some embodiments, the cover plate sub-assembly includes a body portion that lies in a first plane, and that does not have an opening there through for surrounding the outlets or switch, but instead completely covers the outlet except for the plug, light switch, or audio, data, or video connector holes, and a retention member that is fixed to the body portion, that lies in a second plane perpendicular or parallel to the first plane.

The mounting or strapping plate can optionally be connected to the electrical outlet or switch, or audio, data, or video plug, cable, or connector, receptacle box, or wall using a screw or connector that also connects the electrical outlet or switch, or audio, data, or video plug, cable, or connector, to the receptacle box or wall. The planes of the surfaces of the mounting or strapping plate and the cover plate can optionally parallel in any value or range within 1-180 degrees, e.g., but not limited to, 0, 0-5, 0-10, 0-30, 0-40, 0-45, 0-60, 0-90, 0-120, 0-150, 0-160, 10-20, 10-45, 45-90, 90-120, 120-160, 160-180, and the like, degrees.

The shape of the edge of the cover plate can optionally be selected from the group consisting of rounded, curved, angled, concave, convex, raised, stepped, square, beveled, routed, etched, lined, engraved, and any combination thereof. The surface of the cover plate can optionally be painted, dyed, colored, clear, transparent, back painted or dyed, printed with a pattern or image or picture, wall papered, rounded, curved, angled, concave, convex, raised, stepped, square, beveled, routed, etched, lined, engraved, and any combination thereof.

The receptacle or outlet box, outlet, switch, cover plate, mounting or strapping plate, or mud ring, can be any suitable material (e.g., but not limited to, metal, plastic, polymer, wood, injection molded, and the like, or any combination thereof); shape (e.g., but not limited to square, rectangle, round, hexagonal, octagonal, etc., and the like, or any combination thereof); width or height (e.g., but not limited to 1-24 inches or any value or range therein (3.25, 3.5, 4, 4.25, 5, 5.25, 5.5, 6, 7, 7.25, 7.5, 8, 9, 9.25, 9.5, 10, 11, 11.25, 11.5, 12, 15, 15.25, 15.5, 16, inches, and the like); 2-100 cm, or any range or value therein), e.g., but not limited to, 3, 4, 5, 6, 7, 8, 9, 10, and the like); thickness ((e.g., but not limited to 1-24 inches or any value or range therein (3.25, 3.5, 4, 4.25, 5, 5.25, 5.5, 6, 7, 7.25, 7.5, 8, 9, 9.25, 9.5, 10, 11, 11.25, 11.5, 12, 15, 15.25, 15.5, 16, inches, and the like); 2-100 cm, or any range or value therein); as well known in the art, e.g., but not limited to single, double, triple, quadruple outlet or switch, a thickness to accommodate any suitable wall or ceiling joist (e.g., but not limited to 2×3, 2×4, 2×6, 2×8, 2×10, 2×12, 2×16 inches, and the like), or any wall or supporting structure (e.g., but not limited to, masonry, concrete, wood, metal, and the like);

The invention can further comprise a method for using or installing a cover plate assembly, the method comprising:

(A) providing a cover plate assembly for at least one electrical outlet or switch, or audio, data, or video plug, cable, or connector, contained in a receptacle box, the cover plate assembly comprising:

(a) a cover plate sub-assembly that is attachable to at least one electrical outlet or switch, or audio, data, or video plug, cable, or connector, via at least one mounting connector; the cover plate sub-assembly comprising:

(i) a cover plate comprising outer edge portions circumscribing a generally planar body portion that lies between the outer edge portions in a first plane and that has a generally planar back surface disposed parallel to the first plane; and (ii) one or more retention members disposed adjacent to and fixed to the back surface of the cover plate, that lie in a second plane substantially perpendicular to the first plane, wherein:

(A) the one or more retention members selectively engage and substantially conform to the outer surface and edges of the electrical outlet or switch, or audio, data, or video plug, cable, or connector, to releasably secure the cover plate sub-assembly thereto;

(B) the body portion of the cover plate, when releasably secured to the electrical outlet or switch, or audio, data, or video plug, cable, or connector, covers the electrical outlet or switch, or audio, data, or video plug, cable, or connector, except for openings in the cover plate that are aligned and sized to allow access to the electrical outlet or switch, or audio, data, or video plug, cable, or connector; or insertion of an external electrical, audio, video, or data plug, cable, or connector into the electrical outlet or switch, or audio, data, or video plug, cable, or connector; and (B) installing said cover plate assembly by attachment to a receptacle or outlet box, wherein said receptacle or outlet box is attached to one selected from the group consisting of a wall joist, a ceiling joist, a wall, a ceiling, masonry, wood, metal, or concrete.

The edge, tabs, connectors, and/or the like of the retention member optionally selectively engages the rectangular ring shaped mounting or strapping plate to releasably secure the cover plate sub-assembly thereto.

In various exemplary embodiments, the technology described herein provides a snap-on, one-piece screwless cover plate, alone, as a cover plate assembly, or in combination with a rectangular ring shaped mounting, backing or strapping plate, to cover a receptacle box, such as, for example but not limited to, a receptacle box for an electrical outlet or switch, or audio, data, or video plug, cable, or connector, where the cover plate hides any holes, apertures, openings, connectors, tabs, screws or screw holes in one or more of the rectangular ring shaped mounting, backing, or strapping plate which is optionally attached via use of one or more of the housing or receptacle box, outlet, switch, screw, or other holes, apertures or openings, which optionally include use of the screws or other connectors that are used to attach the outlet or switch to the housing or receptacle box or wall or wall covering.

In various embodiments, a snap-on, one-piece screwless cover plate, alone, as a cover plate assembly, or in combination with a rectangular ring shaped mounting, backing or strapping plate, for electrical devices is disclosed. The cover plate assembly can include a snap-on, one piece, screwless cover plate and cover plate assembly for a receptacle box that is capable of being installed directly to an electrical device that is installed in the receptacle box via a rectangular ring shaped mounting or strapping plate that can be attached using existing holes or openings or screw holes provided in the outlet or switch that can optionally include the use of the holes and screws used to attach the outlet or switch to the housing or receptacle box.

In various embodiments, the securing mechanism and/or retention members for or of the cover plate, alone, as a cover plate assembly, or in combination with a rectangular ring shaped mounting, backing or strapping plate, can be in the form of one or more protrusions, prongs, or other structural members (hereinafter referred to generally as "prongs"), each integrally formed or otherwise connected or associated with the cover plate. The prongs integrally formed or attached with the cover plate provide a means of attachment to any electrical device that is mounted into the receptacle box, including, but without limitation, an electrical outlet, light switch, oven plug, cable or phone connection, stereo, etc.

In one optional embodiment, the snap-on, one-piece screwless cover plate, alone, as a cover plate assembly, or in combination with a rectangular ring shaped mounting, backing or strapping plate, includes prongs disposed on the cover plate in a manner in which the cover plate is secured optionally via a rectangular ring shaped mounting or strapping plate to the electrical device in an end, middle, side or center attachment area, or any combination thereof.

In one optional embodiment, the snap-on, one-piece screwless cover plate, alone, as a cover plate assembly, or in combination with a rectangular ring shaped mounting, backing or strapping plate, alone, as a cover plate assembly, or in combination with a rectangular ring shaped mounting, backing or strapping plate, includes prongs, tabs, or connectors no visible from the outside and disposed on the back side of cover plate in a manner in which the cover plate is secured to the electrical device in an attachment area going into one, two, three, four, five, six, seven, eight, nine, or ten existing or punch out or available existing or new holes of the electrical device, located above, between, to the side, below, in the middle, in the center, in the periphery, or any combination thereof, the electrical device, e.g., but not limited to one or more outlets, switches, or any combination thereof, where the cover plate can cover the outlet except for the plug holes, apertures, or openings.

As will be apparent to one of ordinary skill in the art, after reading the disclosure contained herein, there are numerous optional configurations of the locations of the prongs and the shape or size of the prongs which can provide further options to accommodate various devices. Additionally, optional configurations can include 1-gang, 2-gang, 3-gang, and so forth, arrangements. In one optional embodiment, the snap-on, one-piece screwless cover plate and/or cover plate assembly is manufactured of a biodegradable material. In one optional embodiment, the snap-on, one-piece screwless cover plate, alone, as a cover plate assembly, or in combination with a rectangular ring shaped mounting, backing or strapping plate, is manufactured of an anti-bacterial material. In one optional embodiment, the snap-on, one-piece screwless cover plate, alone, as a cover plate assembly, or in combination with a rectangular ring shaped mounting, backing or strapping plate, also includes an insulation portion in order to eliminate the need for separate foam insulation cutouts to go underneath a cover plate. In one optional embodiment, the snap-on, one-piece screwless cover plate, alone, as a cover plate assembly, or in combination with a rectangular ring shaped mounting, backing or strapping plate, can be made of a plastic material having a coating that makes the cover plate to appear to be made of metal. The type of plastic used in any of the embodiments can vary according to its end use. By way of example, the plastic can be nylon, ABS, etc., or any combination of more than one type of plastic.

In one optional embodiment, the snap-on, one-piece screwless cover plate, alone, as a cover plate assembly, or in combination with a rectangular ring shaped mounting, backing or strapping plate, also includes one or more support ribs, the location of which can vary according to the electrical device to which it is attached. The ribs also may be left off entirely if the strength of the plastic is determined to be sufficient.

Advantageously, the snap-on, one-piece screwless cover plate, alone, as a cover plate assembly, or in combination with a rectangular ring shaped mounting, backing or strapping plate, provides easy installation and/or removal, without the use of tools, and sustained coverage of a receptacle box without the need for or use of screws, including those used in known devices through holes in the cover plate or in a separate device that intervenes between the electrical device and the cover plate. The latter such devices appear to be screwless on the face of the cover plate, but actually use screws or other connectors on the intervening device to connect the intervening device to the electrical device. The technology disclosed herein optionally uses no such intervening device. Additionally, utilizing a cover plate, alone, as a cover plate assembly, or in combination with a rectangular ring shaped mounting, backing or strapping plate, without screws ensures that no mismatch of color between screws and the cover plate exists.

Also advantageously, the snap-on, one-piece screwless cover plate, alone, as a cover plate assembly, or in combination with a rectangular ring shaped mounting, backing or strapping plate, provides a solution in which no new receptacle box is required. The snap-on, one-piece screwless cover plate, alone, as a cover plate assembly, or in combination with a rectangular ring shaped mounting, backing or strapping plate, can be distributed new with a receptacle box assembly, an electrical device assembly, or, alternatively, can be distributed individually to be utilized upon an existing receptacle box. In each of the disclosed embodiments, the snap-on, one-piece screwless cover plate and/or cover plate assembly can optionally require no or minor modification by the manufacturer of the existing electrical devices or receptacle boxes to make them work.

Further advantageously, the snap-on, one-piece screwless cover plate, alone, as a cover plate assembly, or in combination with a rectangular ring shaped mounting, backing or strapping plate, provides a solution in which time, labor, and expenses are saved due to the ease of use and installation and/or removal without screws and tools. Manufacturing and packaging costs are also lessened due to the elimination of the screws, painting of the screws, separate packaging of the screws, elimination of shipping of the screws to the cover plate manufacturer, and elimination of any intervening devices. Use of the snap-on, one-piece screwless cover plate, alone, as a cover plate assembly, or in combination with a rectangular ring shaped mounting, backing or strapping plate, also saves the environment with its use of fewer parts, less packaging, and the elimination of painting of the screws.

There has thus been outlined, rather broadly, the more important features of the technology in order that the detailed description thereof that follows may be better understood, and in order that the present contribution to the art may be better appreciated. There are additional features of the technology that will be described hereinafter and which will form the subject matter of the claims appended hereto. In this respect, before explaining one optional embodiment of the technology in detail, it is to be understood that the invention is not limited in its application to the details of construction and to the arrangements of, and the shape and size of, the components set forth in the following description or illustrated in the drawings. The technology described herein is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the technology described herein.

Further objects and advantages of the technology described herein will be apparent from the following detailed description of a presently preferred embodiment which is illustrated schematically in the accompanying drawings.

BRIEF DESCRIPTION OF THE DRAWINGS

The technology described herein is illustrated with reference to the various drawings, in which like reference numbers denote like device components and/or method steps, respectively, and in which.

DESCRIPTION OF THE INVENTION

Before describing the disclosed embodiments of this technology in detail, it is to be understood that the technology is not limited in its application to the details of the particular arrangements shown here since the technology described is capable of other embodiments. Also, the terminology used herein is for the purpose of description and not of limitation.

In various exemplary embodiments, the technology described herein provides a screwless cover plate, alone, as a cover plate assembly, or in combination with a rectangular ring shaped mounting, backing or strapping plate, to attach any on electrical receptacle, mounting plate, wall, receptacle box, or receptacle box cover plate to cover a receptacle box, such as, for example but not limited to, a receptacle box for an electrical outlet or switch, or audio, data, or video plug, cable, or connector, where the cover plate is part of a cover plate assembly that comprises one or more retention members that selectively engage and substantially conform to the outer surface and edges of the electrical outlet or switch, or audio, data, or video plug, cable, or connector, to releasably secure the cover plate sub-assembly thereto, without the need for additional screws or connectors to attach the cover plate to the outlet, light switch, or audio, data, or video connector.

Cover plates are provided for electrical fixtures including a screwless cover plate and/or cover plate assembly for electrical devices that covers the outlets but provide holes for plugs, light switches, audio, data, or video connectors, and the like, and that do not show screw or attachment holes, and optionally where the cover plate is part of a cover plate assembly that have screwless attachment to a rectangular ring shaped mounting or strapping plate that attaches to the outlet, switch, wall, or housing or receptacle box without showing screw holes, e.g., via tabs or other attachment mechanisms, with or without a backing plate.

FIGS. 1-4 illustrate non limiting examples of embodiments of the invention/present disclosure.

Figure 1:
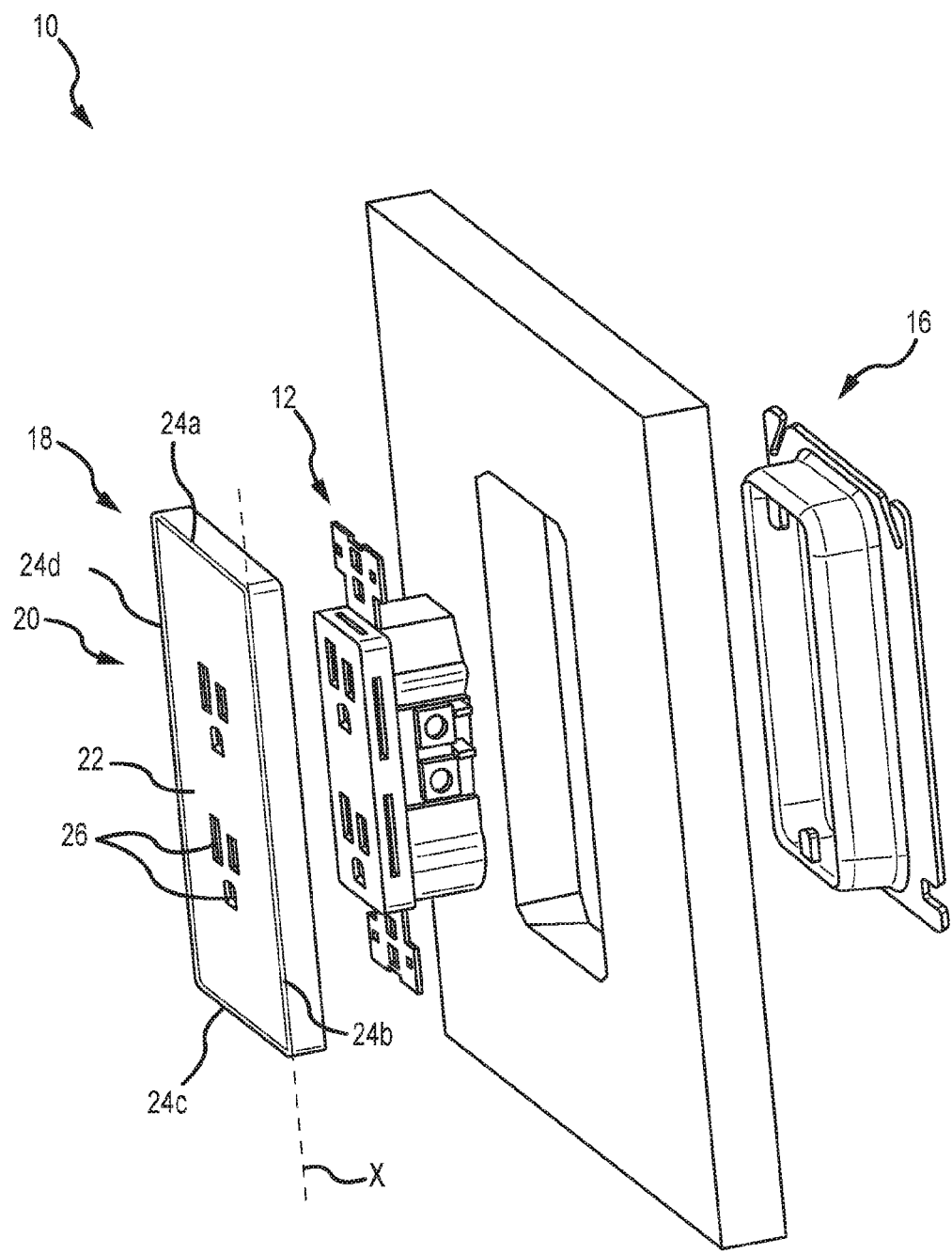
FIG. 1 is a perspective, exploded view of components of electrical outlet or switch, or audio, data, or video plug, cable, or connector, assembly in accordance with the present disclosure.

FIG. 1 illustrates in an exploded perspective view an embodiment of electrical outlet or switch, or audio, data, or video plug, cable, or connector, assembly 10 in accordance with the present disclosure. The electrical outlet assembly 10 includes an electrical receptacle 12; a rectangular ring shaped mounting or strapping plate 16 and a cover plate sub-assembly 18. As discussed in further detail herein, the rectangular ring shaped mounting or strapping plate 16 can be secured to the electrical outlet 12 and the cover plate sub-assembly 18 can be releasably secured to the outlet 12.

With particular reference to FIG. 1, the cover plate sub-assembly 18 includes a cover plate 20 having a generally planar body portion 22 and edge portions 24*a*, 24*b*, 24*c*, 24*d* about the perimeter thereof. The body portion 22 generally lies within a first plane that is designated as plane X, and includes one or more plug openings 26 there through.

As described in further detail below, the plug openings 26 enable the cover plate sub-assembly 18 to mount to the outer or front surface of the outlet 12 to cover the outlet except for the plug holes, and also enable access to electrical receptacle(s) of the electrical outlet 12. Although the openings 26 are illustrated as round or slit openings, it is appreciated that the shape of the openings 26 can vary. Other exemplar shapes include, but are not limited to, square, oval, and/or rectangular, or any combination thereof. The openings 26 in the cover plate 20 can optionally be provided to hide one or more of the edges 24*a*-24*d* of the cover plate 20 can be chamfered or rounded to extend out of the plane X, or any other shape, e.g., to optionally cover the gap between the receptacle box or mounting or mud plate and the wall opening. In this manner, the edges 24*a*-24*d* form reinforcing and/or covering features, e.g., but not limited to, optionally to increase the rigidity and strength of the cover plate 20, to provide sufficient strength and stiffness to resist breakage during mounting, and to resist peel-back at the corners.

The cover plate 20 is optionally made from a dielectric, or electrically insulating, material. Exemplar materials include, but are not limited to, urea polymers, thermoplastic polymers such as nylons, polyesters, particularly polyethylene terphthalate (PET), polyester containing copolymers such as PET copolymers, polyolefins, ethylene vinyl alcohol copolymers, acrylonitrile copolymers, acrylic polymers, vinyl polymers, polycarbonate, polystyrene, polyurethanes, and combinations thereof. Other materials can include polyvinyl chloride (PVC), as well as resins containing high impact amorphous polycarbonate (PC) and acrylonitrile-butadiene-styrene (ABS) terpolymer blends, such as Cycoloy® CY6120 from GE Plastics. The cover plate 20 is optionally made from an electrically insulating, non-metallic material that meets relevant industry standards. The material can optionally include one or more additives that can enhance the processing of the material, and improve the quality and characteristics of the cover plate 20. Exemplar materials include, but are not limited to, oxidative and thermal stabilizers, lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators and/or plasticizers. Such additives can be provided in various amounts including, but not limited to, amounts of up to approximately 10% by weight of the overall composition. The cover plate 20 may be formed using various processes. Exemplar processes include, but are not limited to, thermoforming, blow molding and injection molding.

Figure 2:
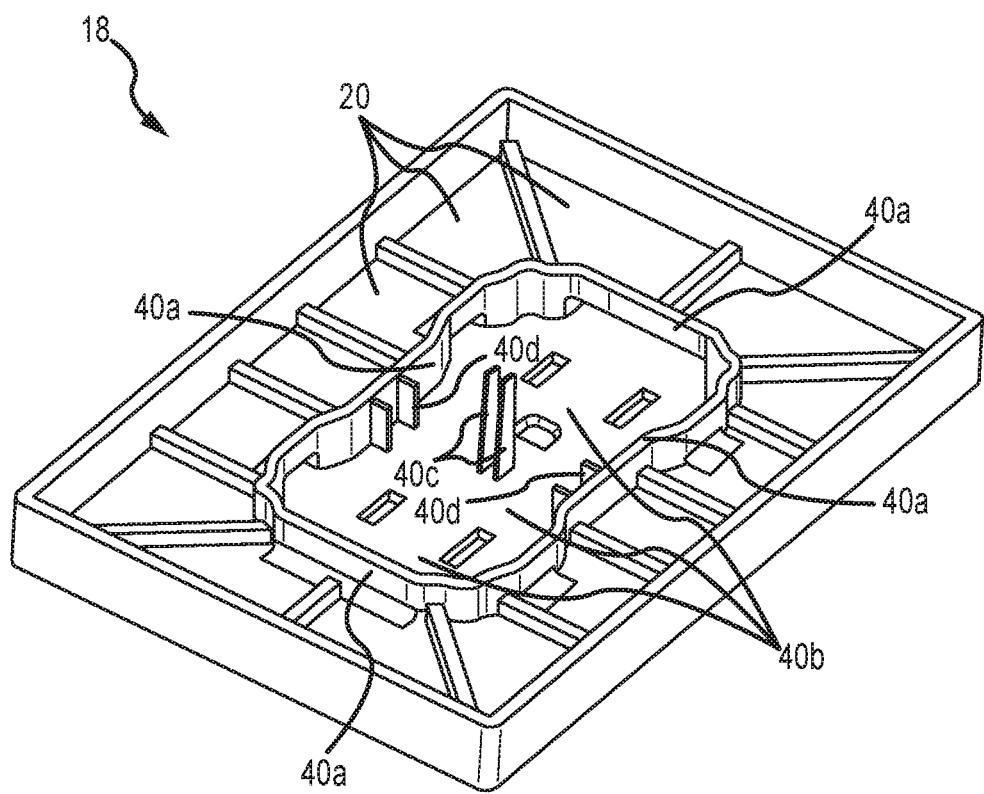
FIG. 2 is a perspective view of components of an electrical outlet or switch, or audio, data, or video plug, cable, or connector, assembly in accordance with the present disclosure.
Figure 3:
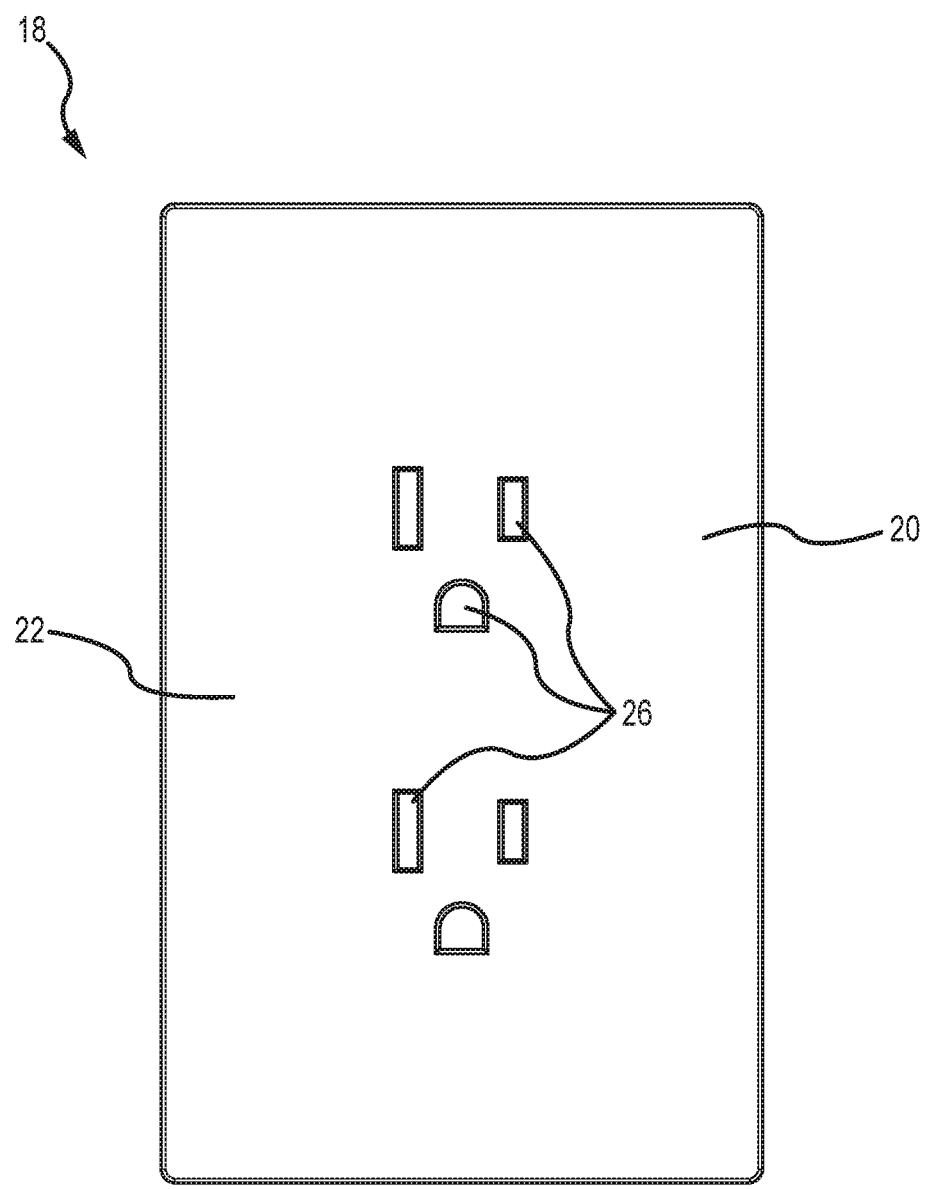
FIG. 3 is a front view of the face plate cover and wall as viewed after installation in accordance with the present disclosure; and, FIG. 4 is a rear isometric view of an electrical outlet or switch, or audio, data, or video plug, cable, or connector, assembly in accordance with the present disclosure.
Figure 4:
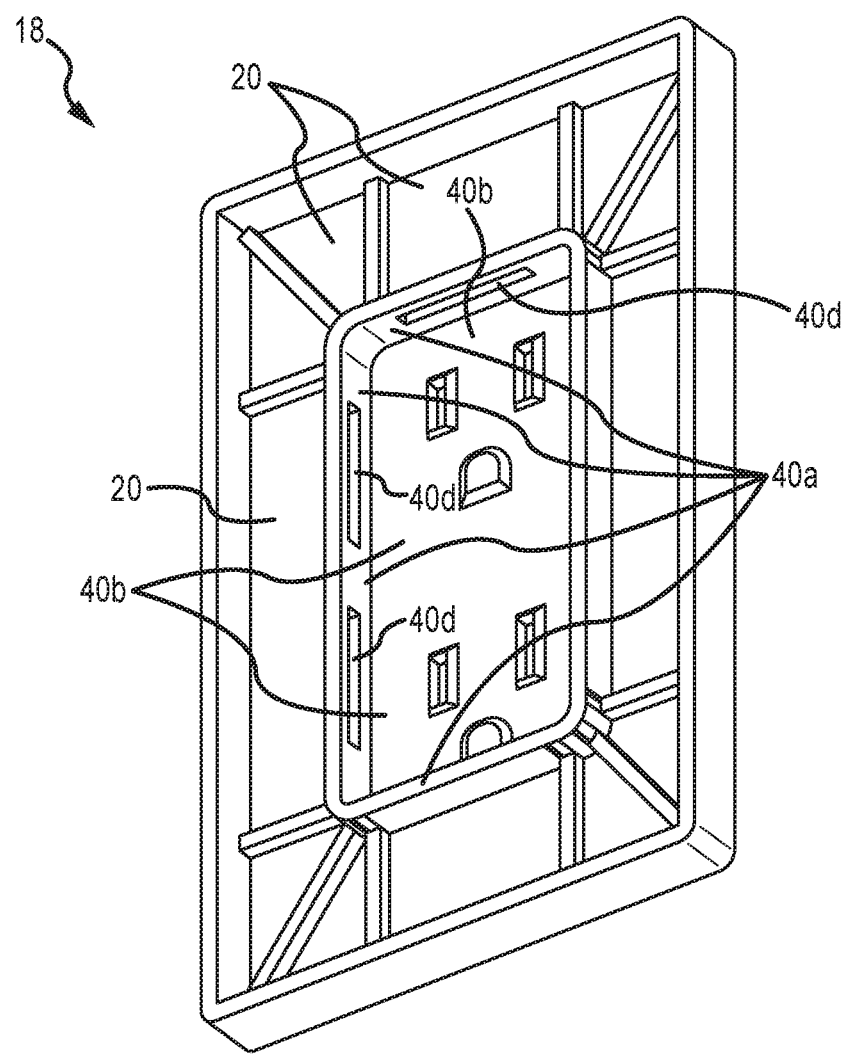

Referring now to FIGS. 2 and 4, retention members 40A, 40B, 40C and/or 40D are provided to releasably attach the cover plate and/or the cover plate assembly to one or more of an electrical outlet, an electrical switch, and/or a video, audio, and/or data connector or outlet are secured to the back surface of the cover plate 20 of the cover plate assembly 18. Non-limiting examples include at least one or at least a portion of an inner back surface of a retention member 40B of the cover plate 20; at least one or at least a portion of an inside outer edge of a retention member 40A of the cover plate 20; at least one or at least one portion of a projection/optionally locking retention member 40C attached to one or more of the inside surface of the cover plate 20; and/or at least one or at least a portion of a retention member 40D comprising one or more of an inner extending flexible or engaging member. Each of the optional retention members 40A, 40B, 40C, and/or 40D can be configured to releasable hold, contribute to the releasable holding of, the cover plate and/or cover plate assembly to one or more of an electrical outlet, an electrical switch, and/or a video, audio, and/or data plug, cable, or connector or outlet are secured to the back surface of the cover plate 20 of the cover plate assembly 18.

Although various retention members 40A, 40B, 40C, and/or 40D are illustrated, it is appreciated that the cover plate sub-assembly 18 can include more or fewer retention members 40A, 40B, 40C and/or 40D. An embodiment having a single retention member 40, for example, is within the scope of the present disclosure. The retention members 40 are secured to the back surface using any one of various fastening techniques. An exemplar fastening technique includes heat staking. For example, the cover plate 20 can include one or more retention members 40A, 40B, 40C and/or 40D extending therefrom, generally perpendicular to the plane X. Other fastening means can be implemented in alternative embodiments. For example, a fastening member (not shown), such as a screw, can be used to secure the retention members 40 to the cover plate 20. The retention members 40A, 40B, 40C and/or 40D are secured adjacent to the cover plate 20 and generally lie within a second plane.

Referring again to FIGS. 1-4, one or more of the retention members 40A, 40B, 40C and/or 40D are mounted to the back surface of the cover plate (20) such that the ends extend into the openings of the an electrical outlet, an electrical switch, and/or a video, audio, and/or data plug, cable, or connector or outlet, or mounting or strapping plate 16.

The retention members 40 can be made from a number of materials. In one embodiment, the retention members 40 are made from a metallic material. Exemplar metallic materials include, but are not limited to, carbon steels, alloy steels, corrosion resisting steels, phosphor bronze, spring brass, beryllium copper, nickel alloy steels, titanium alloy steels and/or combinations thereof. The retention members 40 can be formed using one or more processes including, but not limited to, stamping.

In an alternative embodiment, the retention members 40 are made from a dielectric, or electrically insulating material that can include, but is not limited to, urea polymers, thermoplastic polymers such as nylons, polyesters, particularly polyethylene terephthalate (PET), polyester containing copolymers such as PET copolymers, polyolefins, ethylene vinyl alcohol copolymers, acrylonitrile copolymers, acrylic polymers, vinyl polymers, polycarbonate, polystyrene, polyurethanes and combinations thereof. Other materials can include polyvinyl chloride (PVC), as well as resins containing high impact amorphous polycarbonate (PC) and acrylonitrile-butadiene-styrene (ABS) terpolymer blends, such as Cycoloy® CY6120 from GE Plastics. In this alternative embodiment, the retention members 40 are optionally made from an electrically insulating, non-metallic material that meets relevant industry standards. The material can optionally include one or more additives that can enhance the processing of the material, and improve the quality and characteristics of the retention members 40, such as one or more of 40A-40D FIGS. 2 and 4. Exemplary materials include, but are not limited to, oxidative and thermal stabilizers, lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators and/or plasticizers. Such additives can be provided in various amounts including, but not limited to, amounts of up to approximately 10% by weight of the overall composition. The retention members 40 may be formed using various processes. Exemplar processes include, but are not limited to, thermoforming, blow molding and injection molding. In one embodiment, the retention members 40A-D can be integrally formed with the cover plate 20 during a forming process.

The rectangular ring shaped mounting or strapping plate 16 can be selectively, replaceably, and/or temporarily attached or permanently attached to the an electrical outlet, an electrical switch, and/or a video, audio, and/or data plug, cable, or connector or outlet 12, wall, additional mounting plate, receptacle box, or receptacle box cover plate. In one embodiment, the rectangular ring shaped mounting or strapping plate 16 can be selectively, replace ably, and/or temporarily attached to the electrical outlet 12, wall, additional mounting plate, receptacle box, or receptacle box cover plate, using fastening means including, but not limited to, screws (not shown). For example, the fastening means can be received, through openings in the rectangular ring shaped mounting or strapping plate 16 and can be received into corresponding openings of the electrical outlet 12 to secure the rectangular ring shaped mounting or strapping plate 16 thereto. In alternative embodiments, the rectangular ring shaped mounting or strapping plate 16 can be permanently attached to the electrical outlet 12, wall, additional mounting plate, receptacle box, or receptacle box cover plate using fastening means including, but not limited to, rivets (not shown). For example, the rivets can be received through openings in the rectangular ring shaped mounting or strapping plate 16 and can be received into corresponding openings of the electrical outlet 12, wall, additional mounting plate, receptacle box, or receptacle box cover plate. The rivet can be deformed, or upset, to secure the rectangular ring shaped mounting or strapping plate 16 to the electrical outlet 12, wall, additional mounting plate, receptacle box, or receptacle box cover plate.

The rectangular ring shaped mounting or strapping plate 16 is optionally made from a dielectric, or electrically insulating, material. Exemplar materials include, but are not limited to, urea polymers, thermoplastic polymers such as nylons, polyesters, particularly polyethylene terephthalate (PET), polyester containing copolymers such as PET copolymers, polyolefins, ethylene vinyl alcohol copolymers, acrylonitrile copolymers, acrylic polymers, vinyl polymers, polycarbonate, polystyrene, polyurethanes and combinations thereof. Other materials can include polyvinyl chloride (PVC), as well as resins containing high impact amorphous polycarbonate (PC) and acrylonitrile-butadiene-styrene (ABS) terpolymer blends, such as Cycoloy® CY6120 from GE Plastics. The rectangular ring shaped mounting or strapping plate 16 is optionally made from an electrically insulating, non-metallic material that meets relevant industry standards.

The material can optionally include one or more additives that can enhance the processing of the material, and improve the quality and characteristics of the rectangular ring shaped mounting or strapping plate 16. Exemplar materials include, but are not limited to, oxidative and thermal stabilizers lubricants, mold release agents, flame-retarding agents, oxidation inhibitors, dyes, pigments and other coloring agents, ultraviolet light stabilizers, organic or inorganic fillers including particulate and fibrous fillers, reinforcing agents, nucleators and/or plasticizers. Such additives can be provided in various amounts including, but not limited to, amounts of up to approximately 10% by weight of the overall composition. The rectangular ring shaped mounting or strapping plate 16 may be formed using various processes. Exemplar processes include, but are not limited to, thermoforming, blow molding and injection molding.

The amount of force required to disengage the cover plate or sub-assembly 18 from the electrical outlet or switch, or audio, data, or video connector 12 can optionally be based on the design or number of retention members 40A-D. For example, less force may be required to disengage a cover plate 20 or sub-assembly 18 having a single retention member 40C FIGS. 2 and 4 than one having multiple retention members, but can optionally be used to facilitate attachment and removal.

The amount of force required to disengage the cover plate or sub-assembly 18 from the electrical outlet or switch, or audio, data, or video connector 12 can further be based on the characteristics of the retention member 40. More specifically, sections of the retention member can be thinner, or thicker to respectively decrease, or increase the spring constant of the retention member.

Referring again to FIGS. 1-4, the electrical outlet or switch, or audio, data, or video connector can include any one of various electrical outlets or switches, or audio, data, or video connectors known in the industry and can include, but is not limited to, a single gang (SG) outlet, a double gang (DG) outlet, any multi-gang outlet, a duplex outlet, and a multi-duplex outlet.

In one embodiment, the electrical outlet 12 can include a reorientable electrical outlet such as those disclosed in U.S. patent application Ser. No. 11/302,924 to Kimberly R. Gerard, which was filed on Dec. 14, 2005, and the disclosure of which is expressly incorporated herein by reference in its entirety. An exemplar reorientable electrical outlet, such as those disclosed in commonly assigned U.S. patent application Ser. No. 11/302,924, can include an electrical receptacle that is rotatably disposed in a housing or receptacle box. In the case of the electrical outlet 12, the electrical receptacles 92 can be rotatably supported by the body 90 to be rotatable about respective axes A. It is also contemplated that the electrical outlet 12 can include a ground fault interrupt (GFI) outlet having a ground fault circuit interrupter (GFCI). The GFCI can include, for example, reset or test buttons, and may be implemented in combination with the embodiments described herein.

Components of the electrical outlet or switch, or audio, data, or video connector are optionally formed of nonconductive material such as plastic or polyvinyl chloride (PVC). The nonconductive components may also be formed of nylon or any other suitable supporting material. In some embodiments, the electrical outlet 12 may be manufactured using resins containing high impact amorphous polycarbonate (PC) and acrylonitrile-butadiene-styrene (ABS) terpolymer blends, such as Cycoloy® CY6120 from GE Plastics. By varying the ratio of PC to ABS in the resin, the electrical outlet 12 may be tailored for residential or industrial use. Further, the overall cost of the electrical outlet 12 may be reduced by employing regrind, or powdering, techniques. Optionally, no more than 15% regrind is employed.

Various prong configurations can be utilized, e.g., 40C FIGS. 2 and 4. The prongs, located on the rear side of the cover plate, for example, are optionally molded into, or otherwise integrally formed with, the cover plate. The prongs can optionally be generally perpendicular or at a slight angle to the cover plate. This configuration enables the cover plate to snap into, onto, or around an electrical device that is attached to the electrical outlet or switch, or audio, data, or video connector 18, for example. The location of the prongs on the cover plate will vary according to which electrical device is connected to the receptacle box. With any electrical device, the locations, shape, and size of the prongs are not limited only to those shown in the Figures.

The prongs as one or more of one more types of retention members can optionally utilize a friction fit, a hooking type of fit, or snap into an existing hole(s) to enable the cover plate to snap onto the electrical device. The prongs can snap into, onto, or around whatever electrical device is used. Examples of prong locations, shapes and sizes of prongs, attachment areas, and electrical devices include, but are not limited to, those depicted in the Figures.

A cover plate having one or more retention members for one or more of at least one middle, outer, or center attachment area on electrical outlet or switch, or audio, data, or video connector, mounting plate, wall, receptacle box, or receptacle box cover plate, where a friction fit is formed when the retention members are placed directly adjacent to the attachment areas on the at least one electrical outlet or switch, or audio, data, or video connector that make up the electrical device. The retention members in this embodiment can optionally provide an outward tension that pushes against the center attachment areas to hold the cover plate securely in place. The cover plate can include an optional slot for ease in removal of the cover plate. The slot provides a grip means by which the cover plate can be pulled and removed with or without the use of a screwdriver or other tool. The location of the slot on any of the embodiments can be on either side or the top or bottom of the cover plate, can be on one, two, three, or four sides, or can be omitted altogether. The size of slot can vary according to need.

A cover plate having a single prong for a center hole attachment area on electrical device can also be optionally used. A friction fit or snap fit is formed when single prong is placed in center hole attachment area of the electrical device. The single prong in this embodiment provides a tension in the center hole, or the like, of an on electrical receptacle, mounting plate, wall, receptacle box, or receptacle box cover plate. The cover plate can include one or more slots for ease in removal of the cover plate, if so desired. The cover plate also can include one or more safety stops, if so desired, to prevent a screwdriver or other devices from penetrating into the area through slot, where an electrical shock could occur when contact is made with certain areas of the electrical device. A reinforcing platform can be a variety of shapes and sizes to accommodate the particular prong and electrical device into which the prong will be inserted. The single prong can vary in shape and size depending on the specific application. By way of example, the shape of the prong can include threads or fins.

In one optional embodiment, the snap-on, one-piece screwless cover plate 10 includes retention members disposed on the cover plate 10 in a manner in which the cover plate 10 is secured to the electrical device 12 in an attachment area going into two existing holes of the electrical device 12, one located above and one located below the electrical device. The shape of the retention members can vary depending on the specific application. By way of example, the shape of the retention members can include threads or slots. The shape of the opening can vary according to the on electrical receptacle, mounting plate, wall, receptacle box, or receptacle box cover plate to which it is attached. In this embodiment, the opening can accommodate a larger switch such as a light switch, dimmer switch, or the like.

A cover plate can also be provided having retention members for a light switch attachment area, or the like. In this optional embodiment, the retention members include a channel. The channel aids in providing a tension to the device. As the cover plate is inserted, the retention members are able to be depressed slightly to enter holes. This provides additional tension to secure the cover plate to the electrical device to which it is attached. A cover plate for a light switch, or the like, can optionally provide a friction fit or snap fit formed when retention members are attached to the side of the electrical light switch in the receptacle box. The width of the space between the retention members can vary according to the type of light switch or electrical device to which it is attached. The locations of the retention members can be duplicated and adjusted for 1-gang, 2-gang, etc. configurations. The shape of the opening between retention members can vary according to the type of device to which the cover plate is attached. By way of example, the shape of the opening can be rectangular, round, etc., according to the electrical device to which it is attached.

As will be apparent to one of ordinary skill in the art, after reading the disclosure contained herein, there are numerous optional configurations of the locations of the retention members and the shape, size, and configuration of the retention members, as well as openings, which can provide further options to accommodate various devices.

Although this technology has been illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the invention and are intended to be covered by the following claims.

What is claimed is:

1. A cover plate assembly for at least one electrical outlet or switch, or audio, data, or video plug, cable, or connector, contained in a receptacle box, the cover plate assembly comprising: (a) a cover plate sub-assembly that is attachable to at least one electrical outlet or switch, or audio, data, or video plug, cable, or connector, via at least one mounting connector; the cover plate sub-assembly comprising: (i) a cover plate comprising outer edge portions circumscribing a generally planar body portion that lies between the outer edge portions in a first plane and that has a generally planar back surface disposed parallel to the first plane: (ii) at least one opening in the cover plate that is aligned and sized to allow access to the electrical outlet or switch; and (iii) one or more retention members disposed adjacent to and fixed to the back surface of the cover plate within the at least one opening in the cover plate that are aligned and sized to allow access to the electrical outlet or switch, wherein the retention members extend from the cover plate in a second plane substantially perpendicular to the first plane, wherein: (A) the one or more retention members selectively engage and substantially conform to at least a portion of an outer surface of an outer edge of the electrical outlet or switch, or audio, data, or video plug, cable, or connector, to releasably secure the cover plate sub-assembly thereto, wherein the outer surface of the outer edge is perpendicular to the first plane of the cover plate and the outer surface of the outer edge is adjacent to the cover plate retention members within the at least one opening of the cover plate; (B) the body portion of the cover plate, when releasably secured to the electrical outlet or switch, or audio, data, or video plug, cable, or connector, covers the electrical outlet or switch, or audio, data, or video plug, cable, or connector, except for the at least one opening in the cover plate that is aligned and sized to allow access to the electrical outlet or switch, or audio, data, or video plug, cable, or connector; or insertion of an external electrical, audio, video, or data plug, cable, or connector into the electrical outlet or switch, or audio, data, or video plug, cable, or connector.

2. The plate assembly of claim 1, wherein one or more of the retention members of the cover plate assembly include at least one portion that at least partially extends into and conforms to one or more openings or ridges defined by the outer surface or edge of the electrical outlet or switch, or audio, data, or video plug, cable, or connector, for selectively attaching and/or engaging the back surface of the cover plate, such that the electrical outlet or switch, or audio, data, or video plug, cable, or connector openings and the one or more openings in the cover plate are aligned and sized to allow access to the electrical outlet or switch, or audio, data, or video plug, cable, or connector; or insertion of an external electrical, audio, video, or data plug, cable, or connector into the electrical outlet or switch, or audio, data, or video plug, cable, or connector, through the one or more openings in the cover plate.

3. The plate assembly of claim 1, wherein one or more of the retention members of the cover plate include one or more engagement surfaces that interface with one or more surfaces or openings or edges of the electrical outlet or switch, or audio, data, or video plug, cable, or connector.

4. The plate assembly of claim 3, wherein one or more of the engagement surfaces of the retention members are at an angle relative to an inner plane of a body surface of the cover plate.

5. The plate assembly of claim 1, wherein one or more of the retention members of the cover plate include an arm portion having a first thickness, and an end portion having a second thickness greater than the first thickness; or wherein the cover plate sub-assembly further comprises one or more second retention members that conform to the outer surface or edge of the electrical outlet or switch, or audio, data, or video plug, cable, or connector, and that lie in both parallel and perpendicular planes to that of the cover plate back surface.

6. The plate assembly of claim 1, further comprising openings in the cover plate to accommodate one or more selected from the group consisting of a light switch, a light dimmer, a light or electricity control panel or touchscreen, or sound, wifi, infrared sensors, receivers or transmitters.

7. The plate assembly of claim 1, wherein (a) one or more of the electrical outlets or switches, or audio, data, or video connectors are at least one selected from round, rectangular, or square shaped on a surface perpendicular to the outer surface or edge of the cover plate; (b) are separated from each other at the outward facing surfaces or ends, or (c) are combined as a single unit with two or more the electrical outlet or switch, or audio, data, or video plug, cable, or connector with a single rounded, square, or rectangular shaped surface that is perpendicular to the outward surface of the outlet.

8. The plate assembly of claim 1, further comprising mounting holes or connectors of a mounting or strapping plate that are provided at one or more of the end, side or middle portions of the mounting or strapping plate; and wherein the mounting holes or connectors align with the mounting holes or connectors of a back surface of one or more electrical outlets or switches, or audio, data, or video connectors, or housing or receptacle box.

9. The plate assembly of claim 8, wherein the mounting or strapping plate is connected to the electrical outlet or switch, or audio, data, or video plug, cable, or connector, receptacle box, or wall using a screw or connector that also connects the electrical outlet or switch, or audio, data, or video plug, cable, or connector to the receptacle box or wall.

10. The plate assembly of claim 1, wherein planes of surfaces of a mounting or strapping plate and/or the cover plate are parallel in the range of 0-10 degrees.

11. The plate assembly of claim 1, wherein a footprint of the cover plate is larger than that of a strapping plate or receptacle box to cover any gap between an edge of the receptacle box and an adjacent opening in a wall surface adjacent to the receptacle box when installed.

12. The plate assembly of claim 1, wherein the edge of the cover plate extends between the cover plate and an adjacent wall to cover any gap between a cover plate edge and the adjacent wall.

13. The plate assembly of claim 1, wherein a shape of an edge of the cover plate is selected from the group consisting of rounded, curved, angled, concave, convex, raised, stepped, square, beveled, routed, etched, lined, engraved, and any combination thereof.

14. The plate assembly of claim 1, wherein a surface of the cover plate is dyed, colored, painted, printed, clear, transparent, clear and back painted, coated or printed, wallpapered, rounded, curved, angled, concave, convex, raised, stepped, square, beveled, routed, etched, lined, engraved, and any combination thereof.

15. The plate assembly of claim 1, wherein the cover plate further comprises a spring mechanism and hinge to open a cover attached to a mounting or strapping plate or receptacle box.

16. The plate assembly of claim 15, wherein the spring mechanism and the hinge are provided in a second cover plate provided over the cover plate and attached to one selected from the cover plate, the mounting or strapping plate, the housing or receptacle box, and a wall surface adjacent to the second cover plate when installed.

17. The plate assembly of claim 1, further comprising a mud ring or raised device plate provided between the cover plate and a mounting or strapping plate, wherein a mud plate is of a thickness that makes the back of the cover plate flush with an exposed surface of a wall adjacent to a plate assembly when installed.

18. The plate assembly of claim 1, wherein a combined thickness of the cover plate and mounting or strapping plate is less than one selected from the group consisting of $3/4$, $5/8$, $9/16$, $1/2$, $7/16$, $3/8$, $5/16$, $1/4$, $1/8$, and $1/16$ inches.

* * * * *